United States Patent [19]

Cullen

[11] Patent Number: 5,421,142
[45] Date of Patent: Jun. 6, 1995

[54] AGRICULTURAL BAGGING MACHINE

[75] Inventor: Steven R. Cullen, Astoria, Oreg.

[73] Assignee: Versa Corporation, Astoria, Oreg.

[21] Appl. No.: 247,046

[22] Filed: May 20, 1994

[51] Int. Cl.6 .......................... B65B 9/10; B65B 9/20
[52] U.S. Cl. ........................................ 53/567; 53/575;
                                                53/201; 100/100
[58] Field of Search ................. 53/201, 528, 527, 529,
          53/530, 567, 575, 576, 577; 100/65, 100, 144;
                              453/37, 38, 45; 141/114, 314

[56] References Cited
U.S. PATENT DOCUMENTS

| | | | |
|---|---|---|---|
| 3,001,345 | 9/1961 | Zeller | 53/201 |
| 3,791,593 | 2/1974 | Griffin | 239/667 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,621,666 | 11/1986 | Ryan | 53/576 |
| 4,653,553 | 3/1987 | Cox et al. | 141/114 |
| 4,688,480 | 8/1987 | Ryan | 100/144 |
| 4,724,876 | 2/1988 | Ryan | 100/144 |
| 4,945,715 | 8/1990 | Brodrecht | 53/567 |
| 4,949,633 | 8/1990 | Johnson et al. | 100/65 |
| 5,159,877 | 11/1992 | Inman et al. | 100/144 |
| 5,269,829 | 12/1993 | Meyer | 71/9 |
| 5,295,554 | 3/1994 | Cullen | 180/236 |
| 5,297,377 | 3/1994 | Cullen | 53/527 |

Primary Examiner—John Sipos
Assistant Examiner—Rodney A. Butler
Attorney, Agent, or Firm—Zarley, McKee, Thomte, Voorhees & Sease; Dennis L. Thomte

[57] ABSTRACT

An agricultural bagging machine including a wheeled frame having an upstanding face panel to which multiple size tunnels may be attached.

4 Claims, 3 Drawing Sheets

AGRICULTURAL BAGGING MACHINE

BACKGROUND OF THE INVENTION

1. Field of the Invention

This invention relates to an agricultural bagging machine and more particularly to an agricultural bagging machine having the capability of having tunnels of various sizes secured thereto.

2. Background Information

Agricultural bagging machines have been employed for several years to bag or pack silage or the like into elongated plastic bags. Two of the earliest bagging machines are disclosed in U.S. Pat. Nos. 3,687,061 and 4,046,068. The conventional bagging machines normally comprised a wheeled frame having a hopper or the like positioned on the forward end thereof with a rearwardly extending tunnel. In the past, a conventional bagging machine either had an eight-foot tunnel, nine-foot tunnel or a ten-foot tunnel. It has long been an industry desire to be able to have a single bagging machine which was capable of properly filling multiple bag sizes. With the invention of applicant's bagging machine wherein cables are employed to control the density of the feed stuffs in the tunnels, machines are now available to fill different size tunnels and/or bags.

SUMMARY OF THE INVENTION

An improved agricultural bagging machine is disclosed which includes a hopper at the forward end of the machine which receives the materials to be bagged. The hopper includes an upstanding face panel at its rearward end which has a feed passageway provided therein. A horizontally disposed rotor is rotatably mounted on the bagging machine adjacent the passageway and is in communication with the hopper for forcing material to be bagged rearwardly therethrough. The face panel is provided with a plurality of horizontally extending and vertically spaced cross tubes provided therein. Tunnels of various sizes are adapted to be secured to the face panel. Each of the tunnels, whether they are eight-feet, nine-feet or ten-feet, include an upstanding front panel having an opening formed therethrough which is of the same size as the passageway in the face panel. The front panel is removably bolted to the face panel to maintain the tunnel in position relative to the wheeled frame.

The bagging machine invention disclosed herein which employs multiple tunnel sizes has several benefits. One benefit is that the farmer may employ different size tunnels for different types of feed since it is desirable to feed high moisture shelled corn or other concentrated feeds in a smaller bag and it is desirable to feed basic forages, corn and legume silages from a larger bag. The ability of the machine disclosed herein to accommodate various tunnel sizes also results in a reduced inventory requirement of the basic machines. The distributor or the like may fulfill the needs of a customer for any particular size machine by simply having additional size tunnels on hand. The manufacture sees also some of the same advantages as a distributor. The manufacturer's costs are also reduced due to the ability to have one main bagging machine instead of one for every bag size.

It is therefore a principal object of the invention to provide an improved agricultural bagging machine.

A further object of the invention is to provide an improved agricultural bagging machine having the capability of accommodating various tunnel sizes thereon.

Still another object of the invention is to provide an agricultural bagging machine which is economical of manufacture, durable in use and refined in appearance.

These and other objects will be apparent to those skilled in the art.

DESCRIPTION OF THE PREFERRED EMBODIMENT

Figure 1:
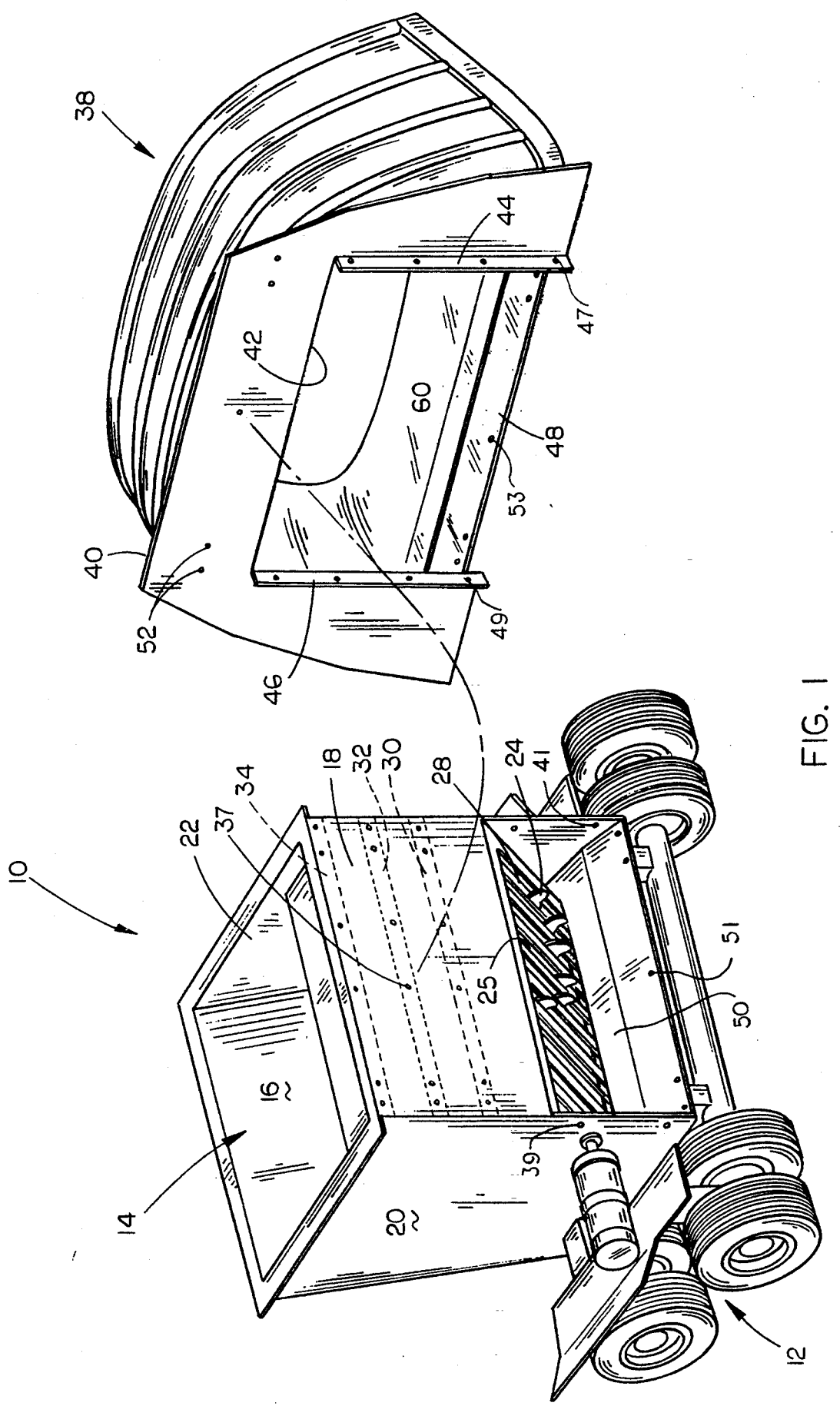
FIG. 1 is an exploded perspective view of the bagging machine of this invention.
Figure 2:
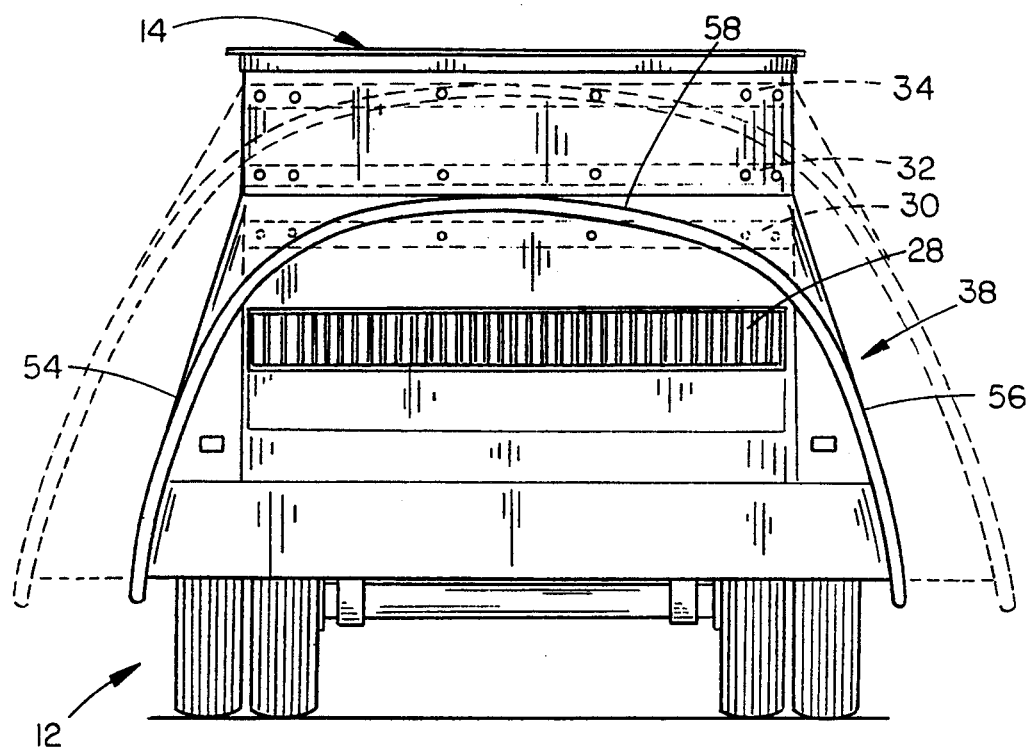
FIG. 2 is a rear view of the bagging machine with the broken lines indicating the positioning of a larger tunnel thereon.
Figure 3:
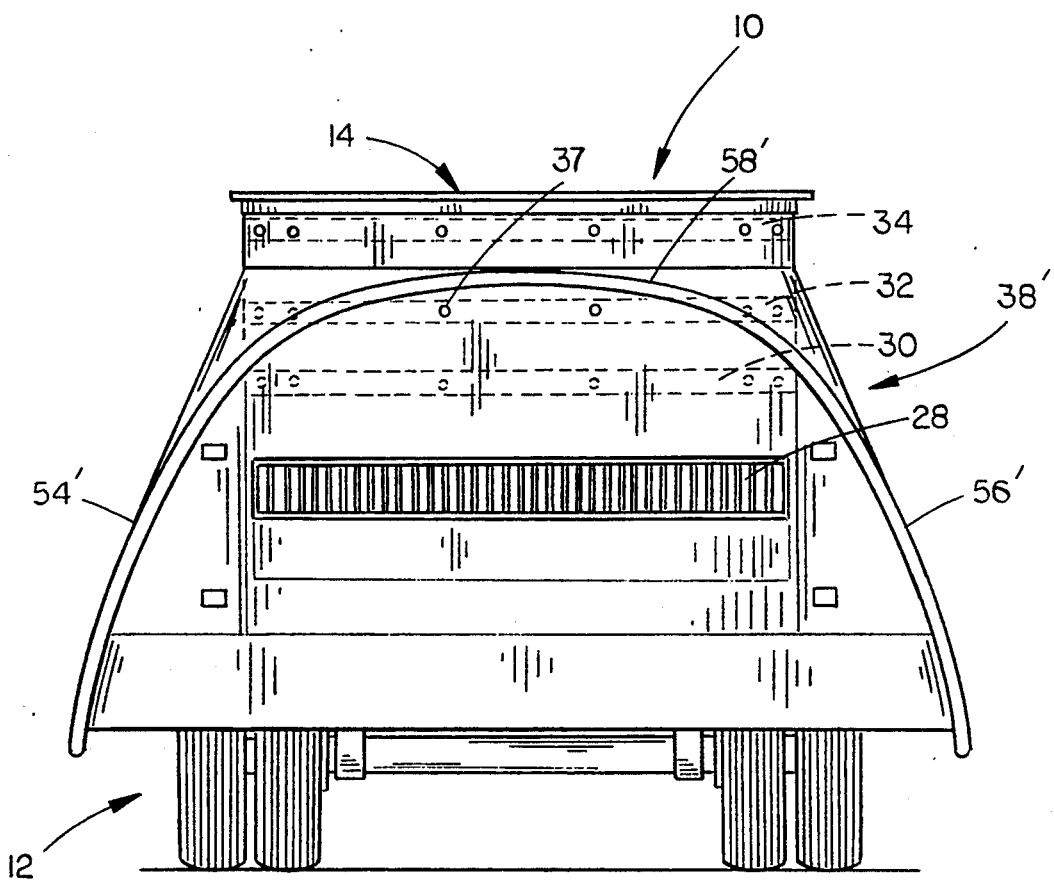
FIG. 3 is a rear view similar to FIG. 2 except that a larger tunnel has been mounted on the machine.

The numeral 10 refers to an agricultural bagging machine which is substantially conventional in design except for the fact that the machine may accommodate different tunnel sizes. Machine 10 includes a wheeled frame means 12. Frame means 12 includes a hopper 14 at the forward end thereof having an inclined front hopper panel 16, rear face panel 18, and opposite sides 20 and 22.

A rotatable rotor 24 of conventional design is illustrated and is located at the lower end of the hopper 14 for forcing the materials to be bagged into the tunnel and into the bag as will be described in more detail hereinafter. For purposes of conciseness, the power means for driving the various components of the machine have not been disclosed since the same does not form a part of the invention. The power means could be an engine mounted on a machine or a PTO shaft connected to a tractor PTO.

Figure 4:
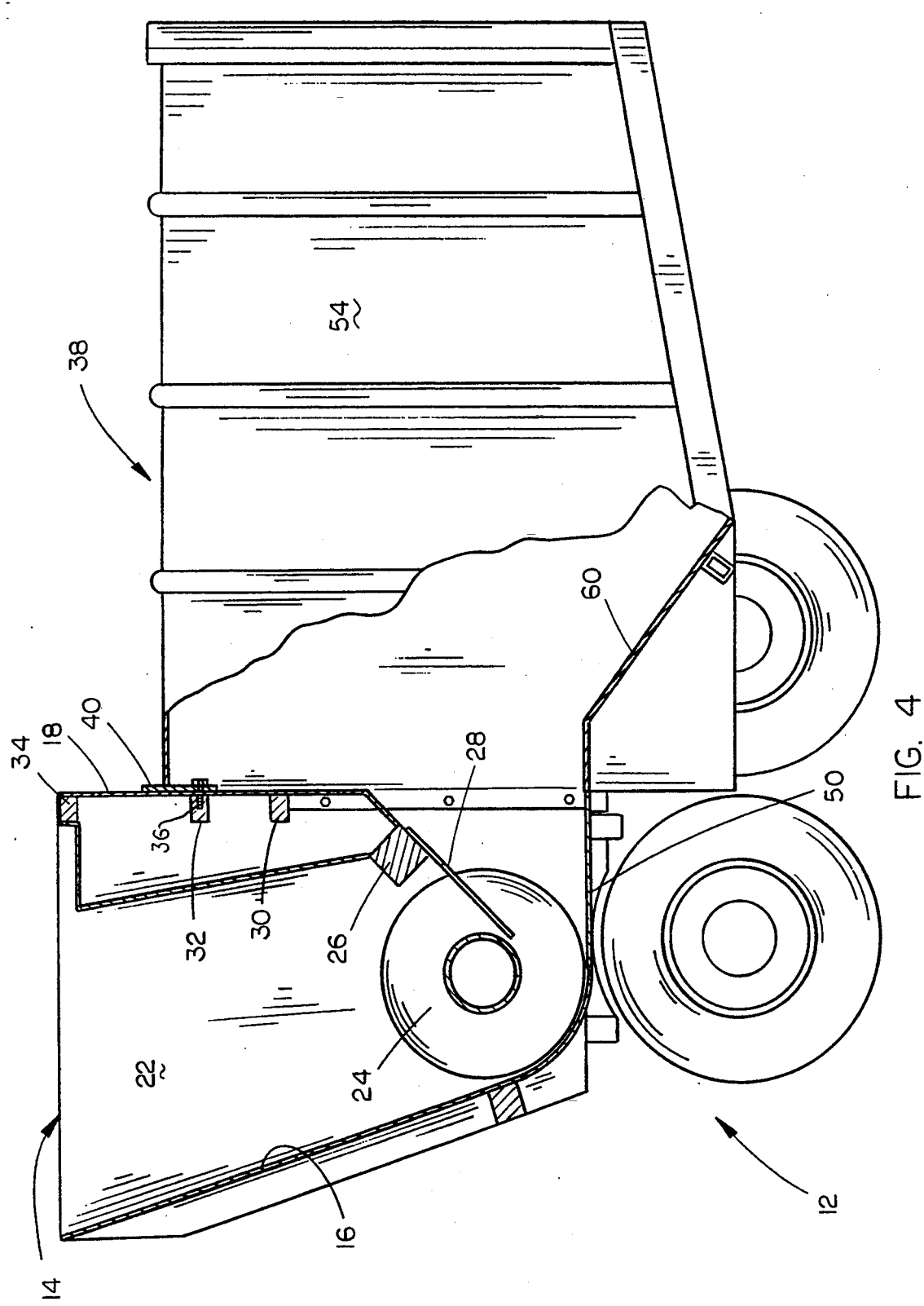
FIG. 4 is a side view of the machine with portions thereof cut-away to more fully illustrate the invention.

Face panel 18 is provided with an opening or passageway 25 formed therein at the lower end thereof as best seen in FIG. 1. Machine 10 includes a main cross frame member 26 which has a plurality of spaced-apart stripping teeth 28 secured thereto which extend downwardly and forwardly therefrom as illustrated in FIG. 4. A plurality of vertically spaced and horizontally extending cross tubes 30, 32 and 34, each of which are provided with internally threaded openings 36 formed therein. Face panel 18 is provided with openings 37 formed therein which register with the internally threaded openings 36 for a purpose which will be described hereinafter. Further, side 20 is provided with openings 39 formed therein at its lower rearward side. Similarly, side 22 is provided with openings 41 formed therein at its lower rearward end.

The numeral 38 refers to the tunnels which may be secured to the machine so as to fill or accommodate various bag sizes. Each of the tunnels 38, whether they are eight-foot tunnels, nine-foot tunnels, or ten-foot tunnels, employ the same structure. Each of the tunnels 38 include a vertically disposed front panel or plate 40 having an opening 42 formed therein which is of the same size as the passageway 25 in face panel 18. Front panel 40 is provided with three flanges 44, 46 and 48 which extend forwardly therefrom at the opposite sides and lower end of the opening 42 as seen in FIG. 1. Flange 44 is adapted to be secured to side 20 by means of bolts extending through openings 39 and 47. Flange 46 is adapted to be secured to side 22 by means of bolts extending through openings 41 and 49. Flange 48 is adapted to be secured to bottom plate 50 by bolts extending through openings 51 and 53.

Front panel 40 is provided with openings 52 formed therein which register with the openings 36 in one of the cross tubes 30, 32 and 34. If the tunnel is an eight-foot tunnel, the openings 52 will register with the openings 37 in cross tube 30. If the tunnel is a nine-foot tunnel, the openings 52 will register with the openings 37 in cross tube 32. If the tunnel is a ten-foot tunnel, the openings 52 will register with the openings 37 in cross tube 34. For purposes of description, the tunnel 38 will be described as including side walls 54 and 56 and a top wall 58. Tunnel 38 also preferably includes a floor portion 60 located at the lower forward end thereof which is aligned with bottom plate 50.

Thus it can be seen that a novel agricultural bagging machine has been provided wherein tunnels having various sizes to bag foodstuffs into bags having various sizes may be quickly and easily mounted thereon depending upon the particular desires of the farmer. Thus, farmer could buy the basic wheeled frame and a single tunnel size if the farmer was going to bag and feed a single type of feed. If the farmer desires to bag and feed different types of feed stuffs, the farmer could purchase additional tunnels without the necessity of purchasing the entire machine.

I claim:

1. An agricultural bagging machine for bagging agricultural material into agricultural bags having a closed end and an open mouth comprising,
    a wheeled frame having rearward and forward ends;
    a hopper on said wheeled frame at the forward end thereof, said hopper being adapted to receive the material to be bagged;
    said hopper including an upstanding face panel at the rearward end thereof;
    said face panel having a feed passageway provided therein;
    a horizontally disposed rotor rotatably mounted on said wheeled frame adjacent said passageway and in communication with said hopper for forcing the material to be bagged rearwardly therethrough,
    and a tunnel on said wheeled frame and having an intake end for receiving the material being forced through said passageway and an output end adapted to receive the open mouth of the agricultural bag,
    said tunnel being removably mounted on said wheeled frame whereby tunnels of different sizes may be selectively mounted on said wheeled frame,
    said tunnel comprising an upstanding front panel which is removably secured to said wheeled frame, and a bag supporting tunnel portion extending rearwardly from said front panel;
    said front panel having an opening formed therein which communicates with said passageway;
    said hopper including opposite side walls;
    said opening in said front panel being rectangular;
    said front panel having mounting flanges provided thereon which extend forwardly therefrom at the opposite side edges of said opening for removable connection to the opposite side walls of said hopper;
    said wheeled frame including a bottom plate which extends between the lower ends of said hopper side walls;
    said front panel having a mounting flange which extends forwardly therefrom adjacent at the lower edge of said
    opening for removable connection to said bottom plate.

2. An agricultural bagging machine for bagging agricultural materials into agricultural bags having a closed end and an open mouth comprising,
    a wheeled frame having rearward and forward ends;
    a hopper on said wheeled frame at the forward end thereof, said hopper being adapted to receive the material to be bagged;
    said hopper including an upstanding face panel at the rearward end thereof;
    said face panel including a plurality of alternate tunnel mounts provided thereon;
    a horizontally disposed rotor rotatably mounted on said wheeled frame adjacent said passageway and in communication with said hopper for forcing the material to be bagged rearwardly therethrough;
    and a tunnel on said wheeled frame having an intake end for receiving the material being forced through said passageway and an output end adapted to receive the open mouth of the agricultural bag;
    said tunnel comprising an upstanding front panel which is removably mounted on one of said alternate tunnel mounts on said face panel;
    and a bag supporting tunnel portion extending rearwardly from said front panel whereby tunnels of different sizes may be selectively mounted on one of said alternate tunnel mounts on said wheeled frame;
    said front panel having an opening formed therein which communicates with said passageway;
    said bag supporting tunnel portion including upstanding side walls having a continuous top wall extending therebetween.

3. The machine of claim 2 wherein said tunnel is removably bolted to one of said tunnel mounts.

4. The machine of claim 2 wherein said front panel has mounting flanges provided thereon which extend forwardly therefrom adjacent said opening for removable connection to one of said tunnel mounts.

* * * * *